Figure 1:
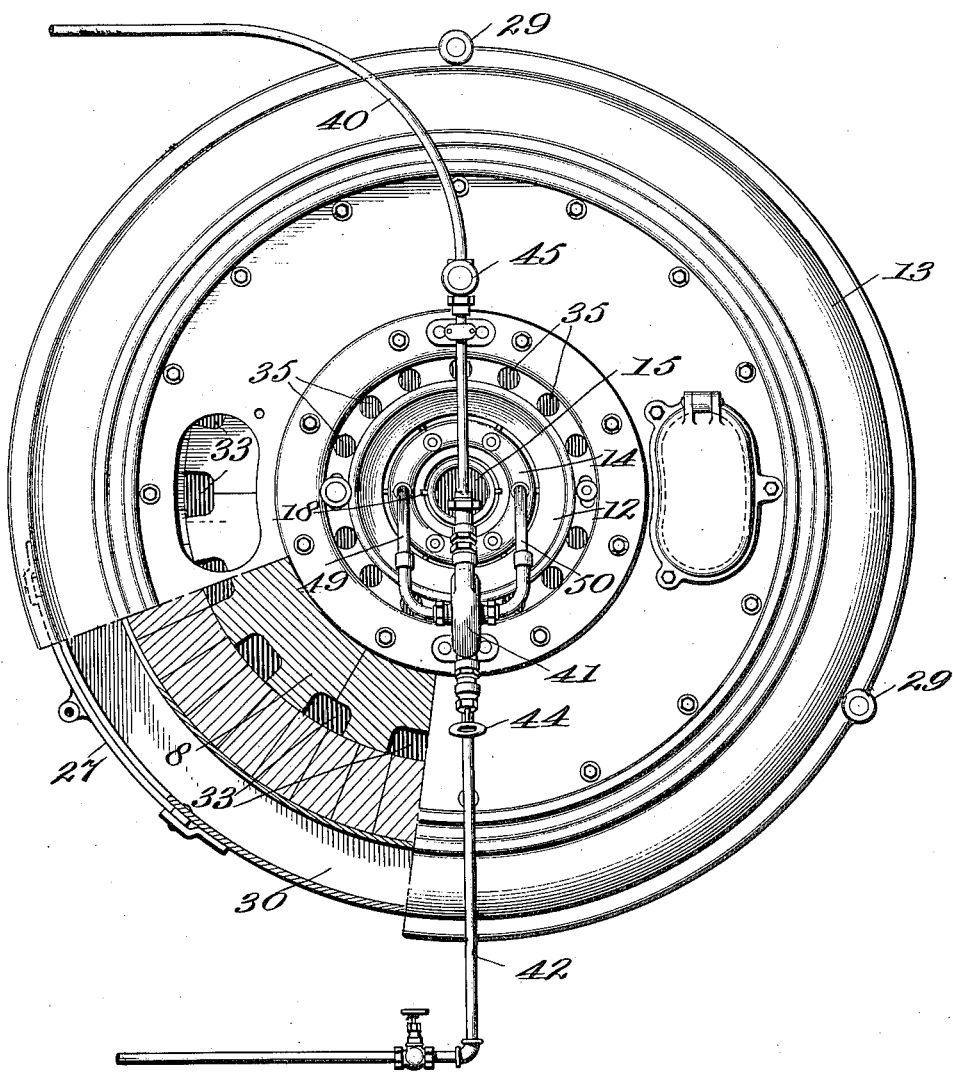

A. H. LIGHT.
OIL FED FURNACE.
APPLICATION FILED MAR. 29, 1910.

1,024,347.

Patented Apr. 23, 1912.
4 SHEETS—SHEET 1.

Witnesses
Geo. A. Byrnes.
B. B. Collings.

Inventor
Arthur H. Light
By Wickersham Fisher &
Wickersham
Attorneys

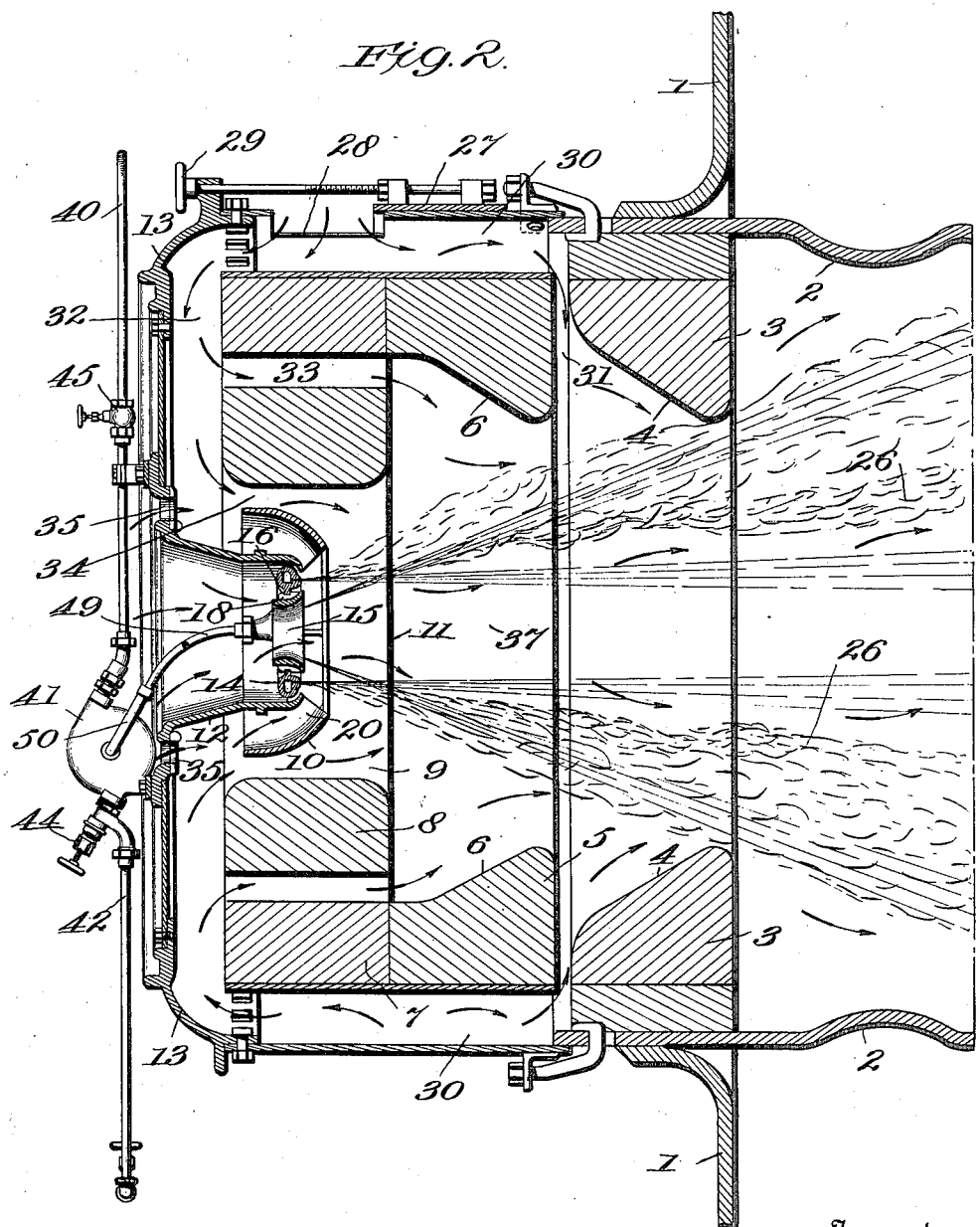

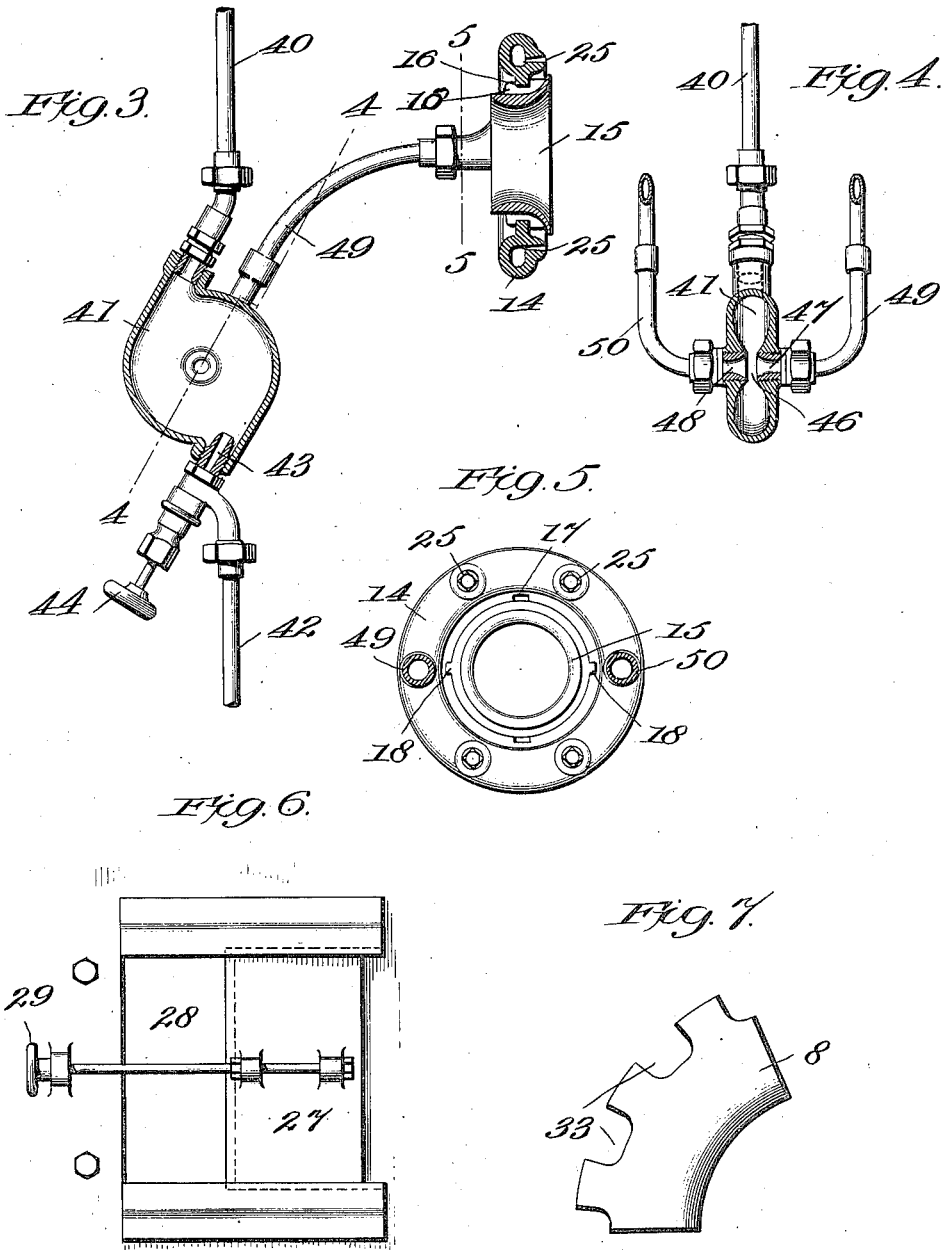

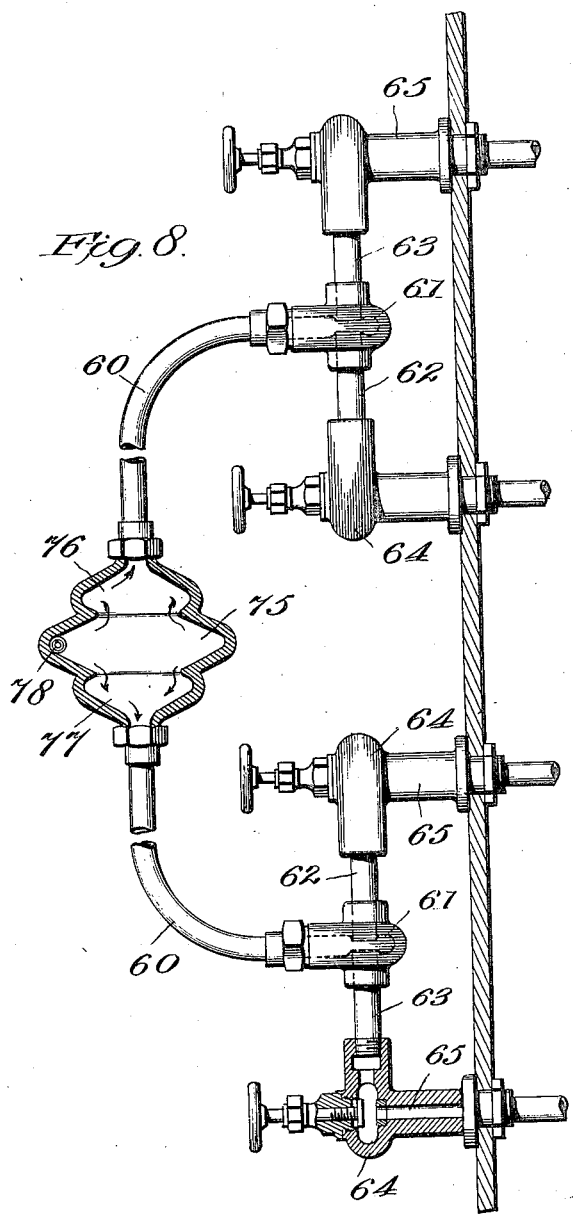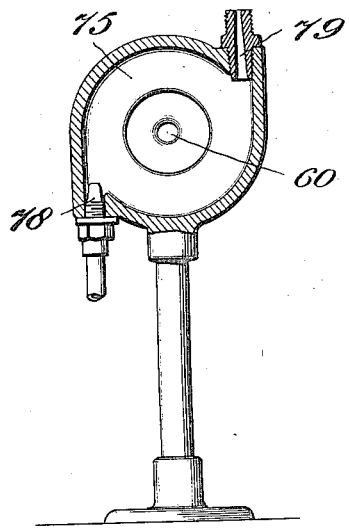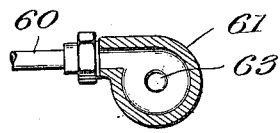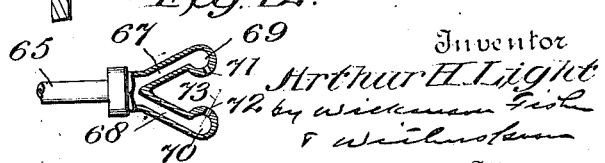

UNITED STATES PATENT OFFICE.

ARTHUR H. LIGHT, OF LOS ANGELES, CALIFORNIA.

OIL-FED FURNACE.

1,024,347.   Specification of Letters Patent.   Patented Apr. 23, 1912.

Application filed March 29, 1910. Serial No. 552,151.

*To all whom it may concern:*

Be it known that I, ARTHUR H. LIGHT, a citizen of the United States, residing at Los Angeles, in the county of Los Angeles and State of California, have invented certain new and useful Improvements in Oil-Fed Furnaces; and I do hereby declare the following to be a full, clear, and exact description of the invention, such as will enable others skilled in the art to which it appertains to make and use the same.

This invention relates to oil fed furnaces and has for its object to produce a more uniform and more complete as well as a more economical combustion in said furnaces than has been heretofore possible.

With these and other ends in view the invention consists in the novel details of construction and combinations of parts more fully hereinafter disclosed and particularly pointed out in the claims.

Referring to the accompanying drawings forming a part of this specification in which like numerals refer to like parts in all the views:—Figure 1, is an end elevational view, partly in section, of a cylindrical furnace with my invention applied thereto; Fig. 2, is a longitudinal sectional view of the parts shown in Fig. 1; Fig. 3, is a sectional elevational view of a portion of the parts shown in Fig. 1; Fig. 4, is a sectional view taken on the line 4—4 of Fig. 3; Fig. 5, is an elevational view of the parts shown in Fig. 3, taken on line 5—5 of said figure; Fig. 6, is a detail elevational view of one of the dampers employed in my furnace; Fig. 7, is a detail of one of the refractory bricks or tiles employed in the furnace; Fig. 8, is a diagrammatic detail view of a modified form of piping especially adapted to locomotive and other furnaces; Fig. 9, is a detail sectional view of the mixing chamber which may be used in connection with the pipe shown in Fig. 8; Fig. 10, is an enlarged detail sectional view of one of the T-joints used in the said pipe; Fig. 11, is a similar view of one of the elbow joints shown in said pipe; and Fig. 12, is a sectional view of the burner tip, which has been found useful in connection with this type of furnace.

1 represents the boiler shell, 2 the furnace proper, 3 a ring of refractory material such as tile or fire brick tapered outwardly as at 4, and 5 a similar ring tapered as at 6.

7 represents a front ring of refractory material with the inwardly projecting portion 8 leaving an enlarged aperture 9. This portion 8 may be conveniently formed of tile or brick of the shape shown in Fig. 7 and provided with notches or passages 33 which abut against the inner surface of the ring 7, substantially as illustrated in Fig. 7.

In the aperture 9 and at a considerable distance forward of the front wall 11 is the burner shield 10, provided with the inner cone-like portion 12 fitting the front plate 13 of the furnace, as shown.

Located inside the cone 12 and supporting the same is the hollow burner proper 14 which is preferably annular in shape and fitting the inside of the same is the tapered ring 15, as shown. The burner 14 is provided with the ports 25 and a web 16 having the notches 17 through which lugs 18 on the ring 15 pass and I thereby form an interlocking engagement between the parts which enables the same to be readily assembled and disassembled, as will be understood.

From the structure so far disclosed, it is evident that the hollow ring shaped burner 14 may be located well forward of the front wall 11 of the furnace and thereby shielded from the heat of the same. It further results from this location of the burner proper that the fuel is not so readily carbonized upon the inner surface of said burner and, therefore, does not clog the ports 25. In addition to this, between the shield 10 and the cone 12 there is a passage 20 which terminates at the inner surface of the burner tips and through which air freely circulates to further aid in keeping the parts cool. This action is also greatly promoted by the passage of air through the cone 12 and the ring 15, on the other side of the said burner tips, so that the latter are constantly subjected to cold air.

The disposition of the parts described enables me, in addition to the advantage of being able to locate the burner tips well forward of the wall 11 of the furnace and constantly bathe the same in cold air as just stated, to also provide a larger ring 14 than has been heretofore customary and, therefore, a wider distribution and separation of carbon fuel in the furnace. This results in lessening the noise. The large size of the ring 14 also enables a large ring 15 to be employed and, therefore, an opening through the latter sufficiently large to admit sufficient air to be supplied to the center of the cone-shaped flame to insure perfect combustion therein. In addition to this, the large opening in the ring 15 permits an inspection of the fire by the attendant at all times and also enables him to start the fire merely by the insertion of a torch when necessary.

In order that the combustion of the oil fuel should be perfect inside the furnace, it is not only necessary to supply sufficient air at the proper portions of the flame, but also that the steam and oil shall be in such a state of fine division that it borders closely on to that of vaporization. In the present instance in order to supply sufficient air to the different portions of the cone-shaped flame 26, I provide the dampers 27 controlling the ports 28 by means of the rods 29, and preferably locate said dampers around the furnace at say 120° apart, as illustrated in Fig. 1. An annular space 30 is provided around the rings 6 and 7 through which cold air passes into the passage 31 between the rings 3 and 6 and reaches the cone-shaped flame over the inclined surface 4, as shown by the arrows. From the space 30 the cold air also passes into the space 32 behind the front plate 13 of the furnace and from there it enters the passages 33 and is deflected by the inclined surface 6 into the cone of flame.

A portion of the air in the space 32 passes down in front of the extension 8 and enters the annular passage 34 between the wall of the orifice 9 and the outer wall of the shield or shell 10, as indicated, and enters the cone just in front of said shell or shield. The air in the passage 32 just described also joins with additional portions of air which enter through the orifices 35 in the front shell or wall 13 of the furnace and together with said portions passes through the passage 20 between the shell or shield 10 and the cone 12 and enters the cone-shaped flame immediately in front of the burner tips, as above stated. The cone-shaped flame 26 being larger than usual it necessarily has a larger space 37 through its center and into this space air freely enters through the cone 12 and ring 15, as above described, and thereby in conjunction with the portions of air above mentioned compel a complete and uniform combustion of the fuel inside the furnace.

After having secured an adequate supply and a uniform distribution of air which is requisite for the above economical combustion of the fuel in the furnace, I next provide, as will now be described, a means for delivering an adequate supply of hydrocarbon fuel in a uniform state of fine division bordering on that of vaporization. That is to say, I have found that when oil and steam are mixed together unless they are thoroughly mixed and most finely divided as by rotary or cyclonic action that there will exist particles of oil not sufficiently finely divided to permit of perfect combustion. Further if the mixed oil and steam is passed through ordinary T connections or elbows in the system of piping the oil is liable to become separated from the steam even though it be previously sufficiently finely divided and to thereupon condense, so to speak, into particles which are too large to permit the best results being attained. To avoid these difficulties and to insure that the oil delivered into the cone-shaped flame 26 shall be in a uniform state of fine division and in just the right proportions to become oxidized by the air entering through the passages above described, I provide in the pipe delivering the oil or fuel what I call a centrifugal T connection, best shown in Fig. 10. This T connection keeps the oil and steam thoroughly incorporated and finely divided without permitting any chance for the oil to leave the steam, as will now be more fully disclosed. In order to illustrate the action of this T connection, it will first be described in connection with a centrifugal mixer shown in Figs. 3 and 4 and which may be used either simply as a T connection or as a centrifugal mixer as desired. That is to say, when only one burner such as 14 is to be used I prefer to provide what I term a combined T connection and centrifugal mixer consisting of a pipe 40 delivering steam tangentially into a circular chamber 41 as illustrated, and a pipe 42 delivering oil into said chamber 41 through a nozzle 43 tangentially arranged, as indicated. A valve 44 may be employed to control the delivery of oil and a valve 45, Fig. 1, may be employed to control the delivery of steam.

The chamber 41 is best illustrated in Fig. 4 and is transversely restricted as at 46 and is provided with delivery ports 47 and 48 which are of the same area as said restricted space 46. The pipes 49 and 50 leading from the ports 47 and 48, respectively, connect with the hollow ring shaped burner 14, and therefore, deliver oil and steam to said burner, as will be readily understood.

The restricted passage 46 being located near the center of the chamber 41, the oil and steam will circulate around the said chamber 41 a plurality of times and at a very high velocity before it is finally forced out of the ports 47 and 48 into the burner, and therefore, the atomized oil and steam will be brought into such close association at the points mentioned that an absolute uniformity in the per cent. of oil that flows through the pipes 49 and 50 will be assured.

In the construction just described it is possible to locate the chamber 41 so close to the furnace that elbows and T's are not necessary and, therefore, little danger exists of the oil separating from the steam before it is delivered from the burner tips or ports 25. In some constructions, however, such for example, as in locomotive furnaces the burner tips have to be distributed over a large surface and, therefore, it is essential to pipe the oil and steam relatively some distance before the burner tip is reached. This piping also frequently necessitates the use of both elbows and T's and consequently it is very desirable to provide against any separation of the oil and steam. In order to accomplish this, I may in such cases, either employ the construction shown in Figs. 3 and 4 in which the valve 44 would be closed and in which the oil and steam would be delivered into the chamber 41 through the pipe 40 and out of the said chamber 41 through the pipes 49 and 50 or I may employ the construction shown in Fig. 8 in which the oil and steam would be delivered tangentially from the pipes 60 into the centrifugal T 61 as best illustrated in Fig. 10, and would be delivered from said T 61 tangentially through the pipes 62 and 63 into the centrifugal valve controlled elbows 64, as best illustrated in Fig. 11. From the elbows 64 the oil and steam pass into the pipes 65 connected to furnace tips of any suitable construction.

The tips in the case of the locomotive furnace such as is diagrammatically illustrated in Fig. 8 may be conveniently of the spherical type, such as shown in Fig. 12, but this is not essential. In such case, the tips would be hollow as illustrated, and provided with angularly arranged passages 67 and 68 leading from spherical chambers 69 and 70 provided with the openings 71 and 72 converging to the point 73 located upon the axis of the pipe 65, as shown. As above stated, however, any other suitable form of tip may be employed.

When oil and steam in a finely divided condition are to be piped relatively a considerable distance, as illustrated in Fig. 8, it is desirable to provide the mixing chamber 75 with the auxiliary chambers 76 and 77, as illustrated. That is to say, the oil may enter through the tangentially arranged nozzle 78 and the steam through the tangentially arranged nozzle 79, whereupon the mixed oil and steam will circulate a plurality of times around the chamber 75 and find its way into the chambers 76 and 77 and after slightly expanding therein finally find its way into the said pipes 60 from which it is delivered into the centrifugal T's 61, as above described.

The advantage of the additional chambers 76 and 77 may be found in the fact that they would form a sort of expansion joint in case the piping should be extensive and they further aid in thoroughly incorporating the oil and steam into a very finely divided mixture. These said chambers, however, are not essential and in many cases may be omitted.

It will be observed that although the form of T joint shown in Figs. 8 and 10 is somewhat different from the combined T and centrifugal mixer shown in Fig. 3 the latter can be substituted for the former, when desired. And, it should also be observed, that although the burner tip shown in Fig. 12 has a different construction from that shown in Figs. 2 and 5 yet the latter may be freely substituted for the former wherever it may be desired. It should also be further observed, that although Fig. 8 shows a system of piping especially adapted for a locomotive furnace, yet, when a series of furnaces of the type illustrated in Fig. 2 are to be employed a system of piping involving the same principles as that shown in Fig. 8, might be desirable. In such cases the combined centrifugal mixer and T shown in Figs. 1 and 2 may conveniently admit steam and oil through the pipe 40 to said T to supply one furnace through the pipes 49 and 50, while conveying a supply of mixed oil and steam out of the chamber 41 through the pipe 42 to another boiler, as will be readily understood.

It will be observed that in all cases, whether a single burner is fed or whether a plurality of burners are fed from a single mixing chamber, my invention insures a means of supplying oil and steam to the burner tips in a uniform finely divided condition closely bordering upon that of vaporization and that, therefore, if a uniform supply of air is delivered to the resulting flame at the proper points a uniform and most economical combustion will ensue. It will be further observed that by deflecting air into the outer portions of the flame, as disclosed, and also by forcing air into the center of the flame, as disclosed, that this uniform combustion is insured so long as the fuel is of the uniform quality above described.

It is obvious that those skilled in the art may vary the arrangement of parts and the details of construction without departing from the spirit of my invention, and, therefore I do not wish to be limited to such features, except as may be required by the claims.

What I claim is:—

1. In an oil fed furnace the combination of a plurality of refractory rings provided with inclined walls and with air passages leading to said walls; an additional front ring; a burner located in the aperture of said ring in front of its inner wall whereby it is shielded from the heat by the same; a shield surrounding said burner leaving an air passage between the wall of said aperture and said shield; and means for regulating the air flowing to all of said passages, substantially as described.

2. In an oil fed furnace, the combination of a refractory lining; a burner adapted to deliver a cone-shaped flame against said lining; passages for delivering a constant supply of air at a plurality of points to the exterior of said cone shaped flame and also to the interior of said flame; and means for supplying a uniform mixture of oil and steam to said burner, substantially as described.

3. In an oil fed furnace the combination of a refractory lining; a burner adapted to deliver a cone-shaped flame against said lining; passages for delivering a constant supply of air at a plurality of points to the exterior of said cone-shaped flame and also to the interior of said flame; and means for supplying a uniform mixture of oil and steam to said burner, comprising a centrifugal mixing chamber adapted to contain oil in which said steam enters tangentially, substantially as described.

4. In an oil fed furnace, the combination of a refractory lining provided with air passages; a burner adapted to deliver a cone-shaped flame against said lining; an air passage associated with said burner adapted to deliver air to the interior of said cone-shaped flame; and an oil and steam mixer adapted to deliver a uniform fuel mixture to said burner comprising a mixing chamber, a tangential entrance thereinto, and delivery pipes leading substantially from the center of said chamber, substantially as described.

5. In an oil fed furnace, the combination of a refractory lining provided with air passages; a burner adapted to deliver a cone-shaped flame against said lining; an air passage associated with said burner adapted to deliver air to the interior of said cone-shaped flame; a shield surrounding said burner and providing an air passage on the outside of said burner; a T connection adapted to be used as an oil and steam mixer and adapted to deliver a uniform fuel mixture to said burner comprising a mixing chamber, a tangential entrance thereinto, and delivery pipes leading from substantially the center of said chamber, substantially as described.

6. In an oil fed furnace, the combination of a ring shaped burner provided with a web 16 having notches 17; a ring 15 having lugs 18 adapted to pass through said notches; and a support for said burner, substantially as described.

7. In an oil fed furnace the combination of a ring shaped burner provided with a web 16 and notches 17; a ring 15 having lugs 18 adapted to pass through said notches; and a support for said burner comprising a cone-like portion 12 adapted to be secured to the shell of the furnace, substantially as described.

In testimony whereof, I affix my signature, in presence of two witnesses.

ARTHUR H. LIGHT.

Witnesses:
H. March,
R. Cotton.